(12) United States Patent
Magnusson et al.

(10) Patent No.: US 11,692,500 B2
(45) Date of Patent: Jul. 4, 2023

(54) INTERNAL COMBUSTION ENGINE SYSTEM

(71) Applicant: Volvo Truck Corporation, Gothenburg (SE)

(72) Inventors: Mathias Magnusson, Gothenburg (SE); Fredrik Blomgren, Hisings Kärra (SE); Lars Carlhammar, Lindome (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/481,807

(22) Filed: Sep. 22, 2021

(65) Prior Publication Data
US 2022/0090566 A1 Mar. 24, 2022

(30) Foreign Application Priority Data
Sep. 24, 2020 (EP) ..................................... 20197959

(51) Int. Cl.
| | |
|---|---|
| *F02D 41/02* | (2006.01) |
| *F02M 26/15* | (2016.01) |
| *F02M 26/34* | (2016.01) |
| *F02M 26/35* | (2016.01) |
| *F02M 26/06* | (2016.01) |

(Continued)

(52) U.S. Cl.
CPC ....... *F02D 41/0255* (2013.01); *F01N 3/2006* (2013.01); *F01N 9/00* (2013.01); *F02D 41/0055* (2013.01); *F02D 41/024* (2013.01); *F02M 26/06* (2016.02); *F02M 26/15* (2016.02); *F02M 26/34* (2016.02); *F02M 26/35* (2016.02);
(Continued)

(58) Field of Classification Search
None
See application file for complete search history.

(56) References Cited

U.S. PATENT DOCUMENTS

| | | | |
|---|---|---|---|
| 5,675,968 A | 10/1997 | Katashiba et al. | |
| 8,365,527 B2 * | 2/2013 | Raab ........................ | F01N 5/02 |
| | | | 60/599 |

(Continued)

FOREIGN PATENT DOCUMENTS

| | | | | |
|---|---|---|---|---|
| CN | 103925050 A | * | 7/2014 | ............... F01N 3/10 |
| CN | 105649847 A | * | 6/2016 | ........... F01N 3/2006 |

(Continued)

OTHER PUBLICATIONS

Extended European Search Report dated Feb. 9, 2021 for European Patent Application No. 20197959.8, 7 pages.

*Primary Examiner* — Kevin R Steckbauer
(74) *Attorney, Agent, or Firm* — Sage Patent Group

(57) ABSTRACT

An internal combustion engine system, including an internal combustion engine (ICE), an exhaust aftertreatment system (EATS) located downstream of said ICE. An exhaust gas recirculation (EGR) pump arranged in an exhaust gas recirculation duct extending between the ICE and EATS, wherein the ICE system has a normal operation mode for transporting, by means of the EGR pump, at least a portion of said exhaust gas to upstream of the ICE. The ICE system further includes a heating device arranged upstream of at least one exhaust aftertreatment devices of said EATS and the ICE system has a pre-heat operation mode for transporting, by means of the EGR pump, exhaust gas and/or air through said heating device and then to said at least one of said exhaust aftertreatment devices.

10 Claims, 10 Drawing Sheets

(51) Int. Cl.
  *F02D 41/00* (2006.01)
  *F01N 3/20* (2006.01)
  *F01N 9/00* (2006.01)

(52) U.S. Cl.
  CPC .......... *F01N 3/2013* (2013.01); *F01N 3/2033* (2013.01); *F01N 2240/14* (2013.01); *F01N 2240/16* (2013.01)

(56) References Cited

U.S. PATENT DOCUMENTS

| | | | | |
|---|---|---|---|---|
| 9,429,053 | B2* | 8/2016 | Keppeler | F02B 37/162 |
| 10,578,039 | B2* | 3/2020 | McKay | F02D 41/0035 |
| 10,655,576 | B2* | 5/2020 | Oh | F02M 26/65 |
| 10,738,672 | B2* | 8/2020 | Harmsen | F01N 5/04 |
| 10,801,427 | B2* | 10/2020 | Han | F02M 26/15 |
| 11,022,055 | B2* | 6/2021 | Aronsson | F01N 3/021 |
| 2009/0133388 | A1* | 5/2009 | Watanabe | F01N 3/2053 60/286 |
| 2010/0139626 | A1* | 6/2010 | Raab | F02G 5/04 123/540 |
| 2011/0094486 | A1* | 4/2011 | Vuk | F01N 5/04 123/568.21 |
| 2014/0318105 | A1* | 10/2014 | Keppeler | F02D 41/029 60/277 |
| 2018/0171903 | A1* | 6/2018 | Aronsson | F02M 26/08 |
| 2019/0063352 | A1* | 2/2019 | McKay | F02M 25/0836 |
| 2019/0316551 | A1* | 10/2019 | Oh | F02M 35/10006 |
| 2019/0331018 | A1* | 10/2019 | Quix | F01N 5/02 |
| 2019/0353108 | A1* | 11/2019 | Han | F02D 21/08 |
| 2020/0332730 | A1* | 10/2020 | Andersson | F02D 41/0007 |
| 2022/0010742 | A1* | 1/2022 | Cox | F02N 11/0829 |
| 2022/0034283 | A1* | 2/2022 | Andersson | F01N 3/2006 |
| 2022/0090566 | A1* | 3/2022 | Magnusson | F02M 26/15 |
| 2022/0106919 | A1* | 4/2022 | Carlén Andersson | F02M 35/10157 |

FOREIGN PATENT DOCUMENTS

| | | | | |
|---|---|---|---|---|
| CN | 107810315 A | * | 3/2018 | ............ F01N 3/021 |
| CN | 107849970 A | * | 3/2018 | ............ F02B 37/18 |
| CN | 105649847 B | * | 6/2019 | .......... F01N 3/2006 |
| CN | 113195877 A | * | 7/2021 | .......... F01N 3/2006 |
| CN | 114245842 A | * | 3/2022 | ............ F02B 33/38 |
| CN | 114320537 A | * | 4/2022 | ............ F02M 26/15 |
| DE | 4325202 A1 | | 3/1994 | |
| DE | 102014100305 A1 | * | 7/2014 | ............ F01N 3/10 |
| DE | 102014017676 A1 | * | 6/2016 | .......... F01N 3/2006 |
| DE | 102017109871 A | * | 11/2017 | ............ B60H 1/18 |
| DE | 102017111027 A1 | * | 11/2017 | .......... F01N 3/2006 |
| DE | 102017111122 A1 | * | 11/2017 | ............ F01N 3/20 |
| DE | 102018218665 A1 | * | 10/2019 | ............ F01N 13/10 |
| DE | 102019135831 A1 | * | 8/2020 | ............ B60K 6/48 |
| DE | 102019135832 A1 | * | 8/2020 | ............ B60K 6/48 |
| DE | 102019122917 A1 | * | 3/2021 | |
| DE | 102020205051 A1 | * | 10/2021 | |
| DE | 102020208986 A1 | * | 1/2022 | |
| DE | 102021115144 A1 | * | 1/2022 | .......... F01N 3/2013 |
| DE | 102020126714 A1 | * | 4/2022 | |
| EP | 0640381 A1 | | 3/1995 | |
| EP | 0945600 A1 | | 9/1999 | |
| EP | 2982842 A1 | * | 2/2016 | .......... F01N 13/009 |
| EP | 2982842 A1 | | 2/2016 | |
| EP | 2788598 B1 | * | 3/2016 | ............ F01N 11/00 |
| EP | 3026244 A1 | * | 6/2016 | .......... F01N 3/2006 |
| EP | 3026244 B1 | * | 3/2017 | .......... F01N 3/2006 |
| EP | 2982842 B1 | * | 3/2018 | .......... F01N 13/009 |
| GB | 2509737 A | * | 7/2014 | ............ F01P 3/20 |
| GB | 2558562 B | * | 10/2019 | .......... F01N 13/009 |
| GB | 2581774 A | * | 9/2020 | ............ B60K 6/48 |
| GB | 2581775 A | * | 9/2020 | ............ B60K 6/48 |
| GB | 2581775 B | * | 9/2021 | ............ B60K 6/48 |
| JP | 2016000971 A | * | 1/2016 | |
| WO | WO-2018127401 A1 | * | 7/2018 | .......... F01N 13/009 |
| WO | WO-2019129369 A1 | * | 7/2019 | ........ B01D 53/9418 |
| WO | 2020119929 A1 | | 6/2020 | |
| WO | WO-2020119929 A1 | * | 6/2020 | .......... F01N 3/2006 |
| WO | WO-2021015613 A1 | * | 1/2021 | ............ F01N 3/021 |

* cited by examiner

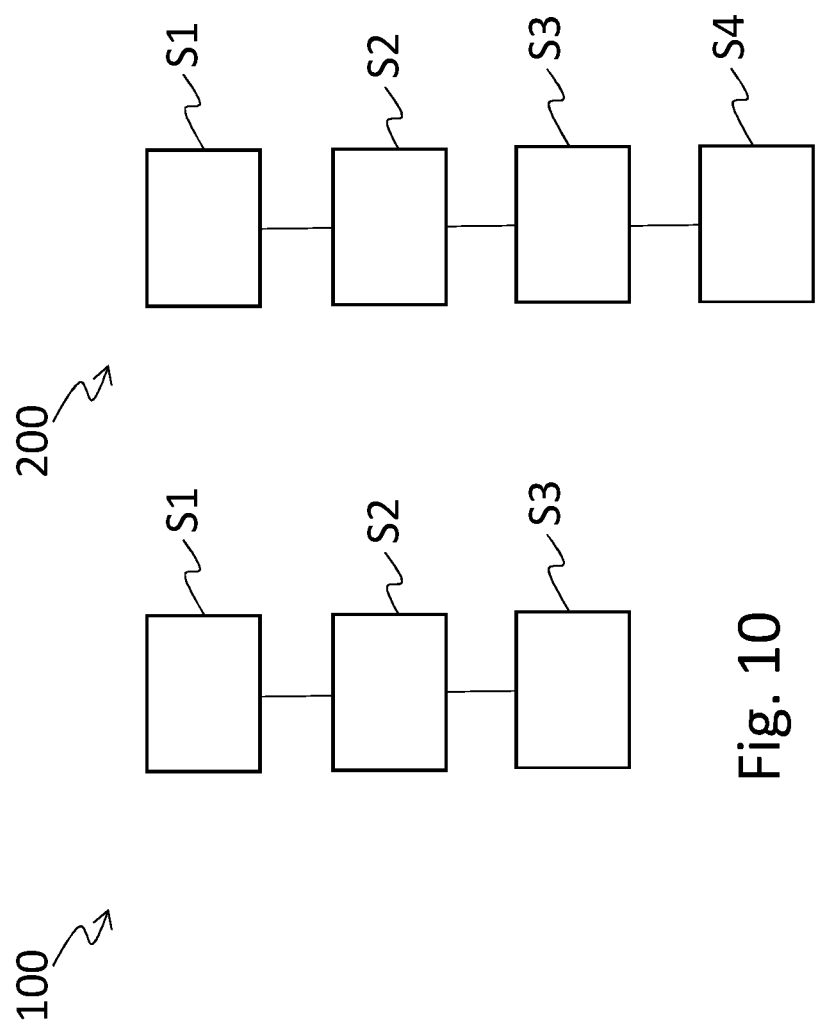

INTERNAL COMBUSTION ENGINE SYSTEM

CROSS-REFERENCE TO RELATED APPLICATIONS

The present application claims benefit of priority to European Patent Application No. 20197959.8, filed Sep. 24, 2020, and is assigned to the same assignee as the present application and is incorporated herein by reference.

TECHNICAL FIELD

The invention relates to an internal combustion engine system, and to a vehicle comprising such an internal combustion engine system. The invention also relates to a method for exhaust gas aftertreatment for an internal combustion engine system, and to a computer program, a computer readable medium and a control unit configured to perform the steps of the method.

The invention can be applied in heavy-duty vehicles, such as trucks, buses and construction equipment. Although the invention will mainly be described with respect to a truck, the invention is not restricted to this particular vehicle, but may also be used in other vehicles such as passenger cars.

BACKGROUND

Diesel engines are often provided with exhaust aftertreatment equipment to satisfy various environmental regulations. The aftertreatment equipment may comprise lone devices but is more typically part of a larger exhaust aftertreatment system (EATS) of the type that usually comprises a plurality of different components, such as a diesel oxidation catalyst (DOC), a diesel particulate filter (DPF) which may include a catalyst, and a selective catalytic reduction catalyst (SCR). Ordinarily, each of the components of the EATS has an optimal operating temperature range. Some components may not perform their intended functions when the temperature is outside this optimal operating temperature range. Particularly, at start-up of the internal combustion engine both the engine and the EATS are at temperatures below the optimal operating temperature range, especially when the vehicle has been subjected to sub-zero temperatures. Consequently, both the engine and the EATS are operated at temperatures so low that the intended functions are not performed properly. In some instances, the EATS can even be damaged as a result of too low operating temperatures. To avoid such a damage, it may be necessary to bypass the components of the EATS. If the EATS components are not operating optimally or are bypassed, it may not be possible for the engine arrangement to attain desired emissions levels. Additionally, it is periodically necessary to regenerate certain EATS components, such as DPFs and SCRs, at higher temperatures than are typically encountered under normal operating conditions. There are presently a number of different arrangements and techniques for more rapidly increasing heating of EATS components and/or generally increasing temperatures of EATS components to provide a "heat mode", such as via use of such devices as variable geometry turbochargers, intake throttles on diesel engines or exhaust restricting devices such as flappers and butterfly valves. Another option is introducing fuel into the exhaust combined with a diesel oxidation catalyst, and/or exhaust burner devices. Conventionally, the arrangements for providing a heat mode have no other function in the EATS. Such arrangements are thus costly and inefficient.

Another way to reduce harmful emissions is disclosed in EP 2 982 842 B1, according to which an aftertreatment system may be provided with at least one abatement device. A portion of the exhaust gas is recirculated through the abatement device without returning to the intake of the internal combustion engine.

Considering the above, it is still desirable to provide arrangements and techniques to supplement or replace existing arrangements and techniques for raising temperature of EATS components to desired operating ranges and/or for purposes of regeneration. It is also desirable to reduce the size of the arrangement for providing a heat mode.

SUMMARY

An object of the invention is to provide an internal combustion engine system, which at least partly alleviates some of the drawbacks of the prior art. The object is achieved by an internal combustion engine system according to claim 1.

Thus, according to a first aspect of the present invention, there is provided an internal combustion engine system, comprising an internal combustion engine (ICE), an exhaust aftertreatment system (EATS) located downstream of said ICE and comprising one or more exhaust aftertreatment devices, an exhaust gas duct fluidly connecting said ICE and said EATS, an exhaust gas recirculation duct being in fluid communication with said exhaust gas duct and fluidly connecting a first point downstream of said ICE and a second point upstream thereof, and an exhaust gas recirculation (EGR) pump arranged in said exhaust gas recirculation duct, wherein the internal combustion engine system has a normal operation mode for transporting, by means of the EGR pump, at least a portion of said exhaust gas from said first point to said second point, wherein the internal combustion engine system further comprises a heating device arranged upstream of at least one of said exhaust aftertreatment devices of said EATS and in that the internal combustion engine system has a pre-heat operation mode for transporting, by means of the EGR pump, exhaust gas and/or air through said heating device and then to said at least one of said exhaust aftertreatment devices.

Such an internal combustion engine system is advantageous in that it is both cost- and space-efficient.

It is particularly advantageous since the relevant exhaust aftertreatment devices of the EATS may be quickly heated during a cold start. Simply installing a heating device, such as a burner or an electric heater, is however not enough to provide a high thermal power to the EATS at cold start conditions. High thermal power is a product of the mass flow, the heat capacity and the temperature. The inventors have realized that the mass flow may be provided without adding an extra pump. More specifically, the inventors have realized that the EGR pump, which nowadays is a common component in existing systems, may advantageously be used not only for recirculation but also for increasing the thermal power. Thus, in the pre-heat operation mode, the internal combustion engine system may use the EGR pump to raise the mass flow (when the ICE is turned on) or to deliver all of the mass flow to the EATS (when the ICE is turned off). Accordingly, by using the EGR pump for providing a high mass flow to the EATS in combination with the heating device for heating the exhaust gas before it reaches the relevant exhaust aftertreatment device(s) of the EATS, a cost- and space-efficient system is achieved.

It should be understood that although the EATS advantageously comprises a plurality of different components, i.e.

different exhaust aftertreatment devices, the inventive principle may be implemented also for EATS having a single aftertreatment device. Furthermore, in case of an EATS having a two or more exhaust aftertreatment devices, suitably arranged in series, the heating device may in some exemplary embodiment be arranged upstream of all of the exhaust aftertreatment devices. In other exemplary embodiments, the heating device may be arranged downstream of one or more of the exhaust aftertreatment devices but upstream of one or more of the remaining exhaust aftertreatment devices. Thus, the selection of placement of the heating device may be based on for which one (or which ones) of the exhaust aftertreatment devices of the EATS that you wish to be able to raise the temperature. Exemplary exhaust aftertreatment devices include diesel oxidation catalysts (DOC), diesel particulate filters (DPF), and selective catalytic reduction catalysts (SCR).

Furthermore, it should be noted that in the pre-heat operation mode, the fluid which is pumped by the EGR pump and to be heated by the heating device is not necessarily exhaust gas at all times. The fluid may, for instance, be a mixture of exhaust gas and air. The fluid may even be just air (without any exhaust gas), which may be the case at for instance cold start, before the ICE is turned on.

It should also be understood that the inventive principle is applicable to both short route EGR and long route EGR. Thus, the exhaust gas may be recirculated from downstream of the EATS, or from upstream of the EATS. The exhaust gas may even be recirculated from a point located between two exhaust aftertreatment devices of the EATS.

The switching between the normal operation mode and the pre-heat operation mode may be achieved in various conceivable ways. For instance, the switching may be achieved by activating valves so that all (or at least some of) the recirculated exhaust gas is bypassed the ICE, instead of returning to the ICE. Alternatively, or additionally, the switching may be achieved by changing the pumping direction of the EGR pump.

The internal combustion engine system may suitable comprise a compressor and a turbine. The turbine may suitably be located downstream of the ICE but upstream of the EATS. The rotation of the turbine caused by the flowing exhaust gas is transmitted into a rotation of the compressor which may thus deliver pressurized intake air to an intake manifold of the ICE.

The recirculation of exhaust gases may be achieved by delivering burnt gases from upstream of such a turbine to downstream of the compressor (short-route) or by taking the exhaust gas from downstream of the turbine and deliver to upstream of the compressor (long-route). Such different EGR routes are at least partly reflected in some of the following exemplary embodiments.

According to at least one exemplary embodiment, said first point downstream of said ICE is arranged adjacent to or within said EATS. Thus, in case of a turbine being included in the internal combustion engine system, the exhaust gas may be recirculated from a point between the turbine and the EATS. Another possibility is to have the recirculation taken from a point located between two exhaust aftertreatment devices of the EATS. Yet another possibility is to have the recirculation taken form a point downstream of the EATS, such as between the EATS and a tail pipe of the internal combustion engine system.

According to at least one exemplary embodiment, the internal combustion engine system comprises a diverter duct fluidly connecting said EGR pump and a recombination point at said exhaust gas duct upstream of said heating device. This provides good control and estimate of how much thermal power is delivered by the fluid flow. It should be noted that in other exemplary embodiments, the recombination point may be located downstream of the heating device relative to the EATS. For instance, in some exemplary embodiments, the heating device may be located between said first point (from where the fluid is recirculated) and the EGR pump. The fluid will be heated before it passes through the EGR pump, but there may still be sufficient thermal power when the fluid is delivered to the recombination point and subsequently to the EATS.

According to at least one exemplary embodiment, said diverter duct comprises a valve being operable between a first open position and a second closed position. This provides for a simple and efficient control of the recombination. The valve may be in the form of a two-way valve or a three-way valve. In case, of a three-way valve, second closed position closes the path to the recombination point, but may still allow flow to a different location. The fluid flow exiting the EGR pump may, for instance, be directed to said recombination point (first open position of a three-way valve) or it may be directed to the intake manifold of the ICE or to the inlet of the compressor (second closed position of the three way valve). Thus, according to at least one exemplary embodiment the internal combustion engine system is configured to set a three-way valve in a first position in the normal operation mode, and in a second position in the pre-heat operation mode. Said three way valve may be provided at a junction to a diverter duct or in a diverter duct.

According to at least one exemplary embodiment, said first point downstream of said ICE is arranged immediately downstream of said ICE. Thus, this may advantageously be implemented as a short-route EGR, which has a faster response time during transient performance compared to long-route EGR. The first point may suitably be provided between the ICE and a turbine of the internal combustion engine.

The EATS may also comprise a purification device, suitably a smaller purification device which may be arranged in a different manner to the other exhaust aftertreatment devices of the EATS. This is reflected in the following exemplary embodiment.

According to at least one exemplary embodiment, the internal combustion engine system comprises a purification duct, being in fluid communication with said exhaust gas duct and comprising a purification device. This is advantageous since it allows for the purification device, which may suitably be smaller than the exhaust aftertreatment devices of the EATS, to be heated relatively quickly and become operational, before the EATS has reached the desired temperature. Suitably, there may be a valve provided for controlling the fluid to pass along the purification duct. The purification duct with its purification device (such as a small SCR) may suitably be located between the turbine and the EATS. The first point downstream of the ICE may suitably be located upstream of the EATS, whereby a quick heating of the purification device may be achieved.

According to at least one exemplary embodiment, said one or more exhaust aftertreatment devices of said EATS comprise at least one of a diesel oxidation catalyst (DOC), a diesel particulate filter (DPF) and a selective catalytic reduction device (SCR). It should, however, be understood that other devices may also be included, such as an ammonia slip catalyst.

According to at least one exemplary embodiment, the internal combustion engine system comprises an electrical energy source, wherein said electrical energy source provides energy to said EGR pump when said ICE is off (i.e. when said ICE is not operating). This is advantageous, since the EGR pump may then pump air to be heated. Suitably, said electrical energy source may provide energy to both the EGR pump and to the heating device. The electrical energy source may comprise a battery, such as a traction battery. As an example, the electrical energy source may for instance be activated when a driver opens the vehicle door, whereby the pre-heat operation mode has started and raised the temperature of the relevant components already before the driver turns the ignition key (or in other manner starts the ICE). This is at least partly further reflected, in the following exemplary embodiment, according to which the internal combustion engine system is configured to be operable in said pre-heat operation mode when said ICE is off.

According to at least one exemplary embodiment, said EGR pump is configured to be operable in a reverse direction when said ICE is off (i.e. when the ICE is not in operation). By allowing for a reverse pumping direction of the EGR pump, a diverter duct may be omitted. The heating device may, for instance, be located between the EGR pump and the turbine. Other conceivable locations are between the turbine and the EATS, or between two exhaust aftertreatment devices of the EATS.

According to a second aspect of the invention, there is provided a method for exhaust gas aftertreatment for an internal combustion engine system. The method also, at least partly, alleviates some of the drawbacks of the prior art. More specifically, this second aspect provides a method for exhaust gas aftertreatment for an internal combustion engine system comprising an internal combustion engine (ICE), an exhaust aftertreatment system (EATS) located downstream of said ICE and comprising one or more exhaust aftertreatment devices, an exhaust gas duct fluidly connecting said ICE and said EATS, an exhaust gas recirculation duct being in fluid communication with said exhaust gas duct and fluidly connecting a first point downstream of said ICE and a second point upstream thereof, and an exhaust gas recirculation (EGR) pump arranged in said exhaust gas recirculation duct, the internal combustion engine system having a normal operation mode for transporting, by means of the EGR pump, at least a portion of said exhaust gas from said first point to said second point. The method is characterized in that it comprises the steps of:
  a) determining a temperature of one or more exhaust aftertreatment devices of said EATS,
  b) comparing said determined temperature with a predetermined threshold value; and
  c) if said determined temperature is below said predetermined threshold value, running said internal combustion engine system in a pre-heat operation mode such that exhaust gas and/or air passes, by means of the EGR pump, through a heating device arranged upstream of at least one of said exhaust aftertreatment devices of said EATS and then to said at least one of said exhaust aftertreatment devices.

The advantages of the method of the second aspect, and any embodiment thereof, are largely analogous to the advantages of the internal combustion engine system of the first aspect, including any embodiment thereof. Thus, the pre-heat operation mode is initiated if it is detected that the temperature of the relevant exhaust aftertreatment device is below the predetermined threshold. Suitably, the determination of the temperature may be obtained by one or more temperature sensors. The determination may be activated on a given command, for instance, the sensors or any input from the sensors may be activated by a given command. Such a command may, for instance, be provided automatically when a certain action is performed by the driver. Examples of such actions may be: opening the door to the cabin of the vehicle, sitting down in the driver seat, pressing a button, etc. In other words, the action may suitably be related to some sort of indication that the driver wants to drive/operate the vehicle. This may be particularly advantageous during cold start conditions, which is reflected in at least the following exemplary embodiment.

Thus, according to at least one exemplary embodiment, said method is performed when said ICE is off. Suitably, the driver may not even notice that the pre-heat operation mode has initiated before he/she turns on the ICE.

According to at least one exemplary embodiment, said method further comprises running said EGR pump in a reverse direction in the pre-heat operation mode of the internal combustion engine system, in comparison with the direction in the normal operation mode. Air may thus be pumped and heated by the heating device to provide thermal power to the relevant exhaust aftertreatment device(s) of the EATS.

According to a third aspect of the invention, there is provided computer program comprising program code means for performing the method steps of the second aspect, including any embodiment thereof, when said program is run on a computer.

According to a fourth aspect of the invention, there is provided a computer readable medium carrying a computer program comprising program code means for performing the method steps of the second aspect, including any embodiment thereof, when said program is run on a computer.

According to a fifth aspect of the invention, there is provided a control unit configured to perform the steps of the method according to the second aspect, including any embodiment thereof. The control unit may suitably receive input from temperature sensors and may determine if the pre-heat operation mode should be activated or not, and when the system is in the pre-heat operation mode, the control unit may determine when it is time to switch to normal operation mode.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to a sixth aspect of the invention, there is provided a vehicle, comprising an internal combustion engine system according to the first aspect, including any embodiment thereof.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 10 illustrates schematically a method according to at least one exemplary embodiment of the present invention.

FIG. 11 illustrates schematically a method according to at least another exemplary embodiment of the present invention.

The drawings are schematic and not necessarily drawn to scale.

DETAILED DESCRIPTION OF EXAMPLE EMBODIMENTS OF THE INVENTION

Figure 1:
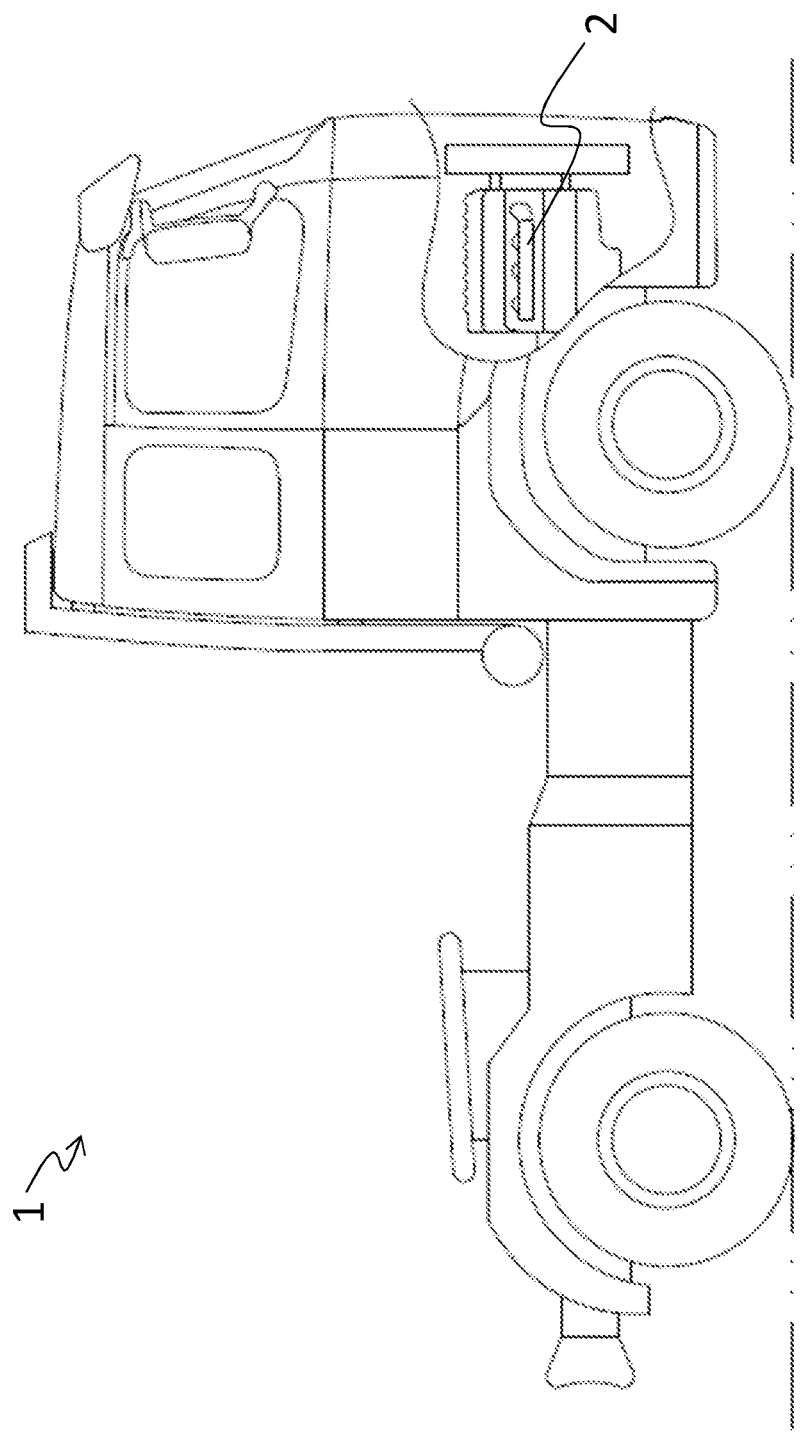
FIG. 1 illustrates a vehicle comprising an internal combustion engine system, in accordance with at least one exemplary embodiment of the present invention.

FIG. 1 is a schematic view illustrating a vehicle 1 comprising an internal combustion engine system 2 in accordance with at least one exemplary embodiment of the invention. In this example, the vehicle 1 is illustrated in the form of a truck, powered by an internal combustion engine (ICE). However, the present invention may well be implemented also in other types of vehicles powered by an ICE, such as busses, construction equipment and passenger cars. Some examples of internal combustion engine systems that may be used in the vehicle are illustrated in FIGS. 3-8. Other embodiments of the internal combustion engine system 2 are also conceivable for implementation in the vehicle 1.

Figure 2:
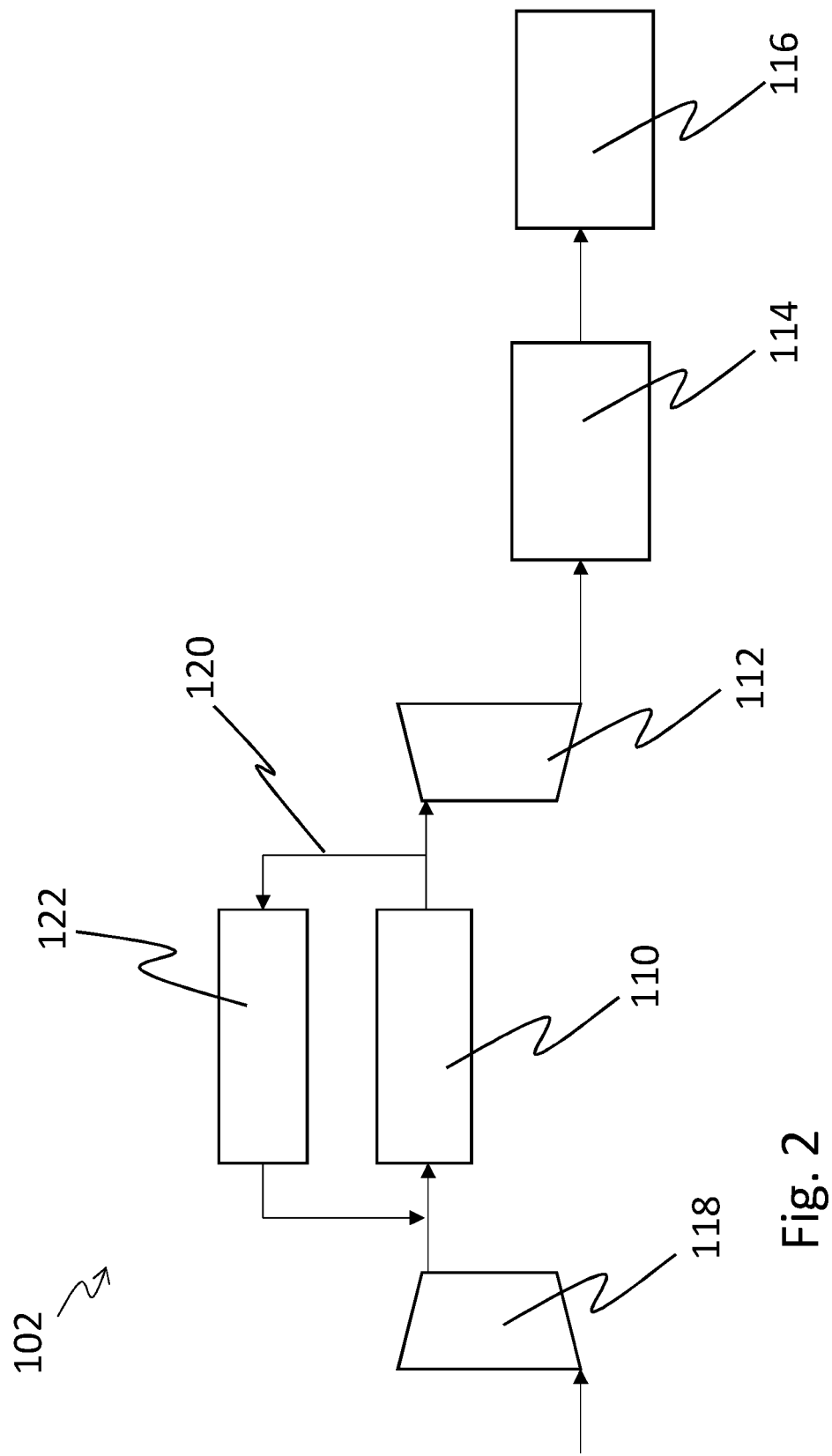
FIG. 2 illustrates schematically a prior art internal combustion engine system.

FIG. 2 illustrates schematically a prior art internal combustion engine system 102. The arrowed solid lines illustrate fluid flow paths. The prior art internal combustion engine system 102 comprises an ICE 110 in which fuel is combusted. Exhaust gas exiting the ICE 110 are delivered to and causes rotation of a turbine 112. After exiting the turbine 112 the exhaust gas continues to the exhaust aftertreatment system (EATS) 114, which limits the amount of environmentally harmful pollutants that exit the vehicle through a tail pipe 116.

The turbine 112 is mechanically coupled (not shown), such as via a shaft, to a compressor 118. The rotational motion of the turbine 112 is thereby transferred to a corresponding rotational motion of the compressor 118. Air is sucked in to the rotating compressor 118, which pressurizes the air and delivers it to an intake manifold of the ICE 110.

Downstream of the ICE 110 but upstream of the turbine 112, there is provided an exhaust gas recirculation (EGR) passage 120 for recirculating exhaust gas to a location upstream of the ICE 110. An EGR pump 122 is provided in the EGR passage 120 for pumping the exhaust gas along the EGR passage 120.

Figure 3:
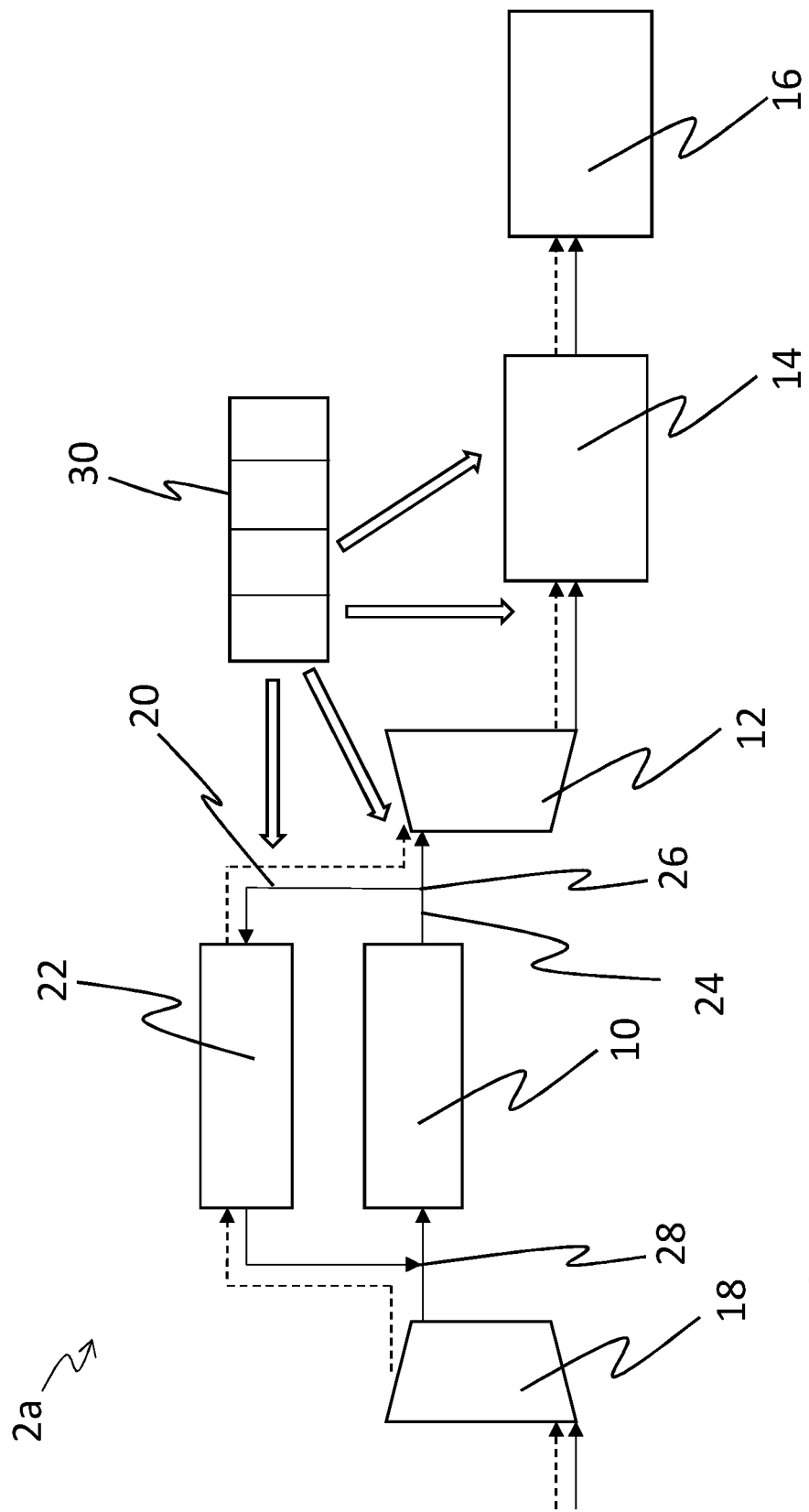
FIG. 3 illustrates schematically an internal combustion engine system, in accordance with at least a first exemplary embodiment of the present invention.

FIG. 3 illustrates schematically an internal combustion engine system 2a, in accordance with at least a first exemplary embodiment of the present invention. The internal combustion engine system 2a is operable in a normal operation mode, in which it may function in a corresponding manner as the prior art.

Thus, similar to the prior art, the internal combustion engine system 2a comprises an ICE 10, a turbine 12, an EATS 14, a tailpipe 16, a compressor 18 and an EGR pump 22. Although only one box is illustrated for representing the EATS 14, it should be understood that the EATS 14 may comprise one or more exhaust aftertreatment devices, such as a DOC, a DPF and/or an SCR. An exhaust gas duct 24 connects the ICE 10 and the EATS 14, and similarly to the prior art, the turbine 12 is provided in the exhaust gas duct 24. Thus, the exhaust gas may flow from the ICE 10 via the turbine 12 to the EATS 14. An EGR duct is in fluid communication with said exhaust gas duct 24 and fluidly connects a first point 26 downstream of the ICE 10 (in this illustration upstream of the turbine 12) and a second point 28 upstream of the ICE 10. By means of the EGR pump 22, the internal combustion engine system 2a will in the normal operating mode transport at least a portion of the exhaust gas from the first point 26 to the second point 28. It should be understood that although the present exemplary embodiment illustrates the first point 26 as being immediately downstream of the ICE 10, in modifications of the exemplary embodiment it could be provided further downstream, such as downstream of the turbine 12.

Although not illustrated, the EGR duct 20 may suitably be provided with a valve for regulating the amount of exhaust gas that is to be recirculated in relation to the amount that is to be lead to the EATS 14. For instance, such a regulating valve may be located at said first point 26 (i.e. between the ICE 10 and the turbine 12), or between the first point 26 and the EGR pump 22.

Furthermore, although not illustrated, the EGR duct 20 may suitably be provided with an EGR cooler to cool the exhaust gas in normal operation mode before it is returned to the ICE 10. In the pre-heat operation mode, which will be discussed in the following, the EGR cooler may suitably be switched off or by-passed.

The internal combustion engine system further comprises a heating device 30 arranged upstream of the EATS 14, or upstream of at least one (or more) exhaust aftertreatment devices of the EATS 14. As illustrated by the white arrows the heating device 30 may be arranged at various different locations. The right-most white arrow points at the EATS 14, thus suggesting that one conceivable location is between two exhaust aftertreatment devices of the EATS 14. The location is suitably chosen based on which one or which ones of the exhaust aftertreatment devices that is/are desired to be pre-heatable, in order to relatively quickly reach a desired operating temperature of the device(s). The other indicated possible locations are between the turbine 12 and the EATS 14, between the ICE 10 and the turbine 12, or in the EGR duct 20 (between the EGR pump 22 and the turbine 12).

In the illustrated exemplary embodiment of FIG. 3, the internal combustion engine system 2a may be configured to operate the EGR pump 22 in a reverse direction, in order to work in a pre-heat operation mode. In FIG. 3, the flow paths of the normal operation mode are illustrated by the solid arrows. The flow paths of the pre-heat operation mode are illustrated by the dashed arrows. As illustrated, in the pre-heat operation mode, the EGR pump 22 may transport air from outside the vehicle through the compressor 18, the EGR pump 22 via the EGR duct 20 to the exhaust gas duct 24, and then to the turbine 12, the EATS 14 and the tail pipe 16. On its way the air will be heated by the heating device 30 before it reaches the EATS 14 or the exhaust aftertreatment device(s) of the EATS 14 for which a quick rise of temperature is desired to achieve. The ICE 10 may suitably be turned off in this pre-heat operation mode.

Thus, the internal combustion engine system 2a has a pre-heat operation mode for transporting, by means of the EGR pump 22, air through the heating device 30 and then to the at least one exhaust aftertreatment device. As will be illustrated in the following figures, in other exemplary embodiments, the EGR pump 22 may instead of air, or in addition to air, transport exhaust gas in the pre-heat operation mode.

Figure 4:
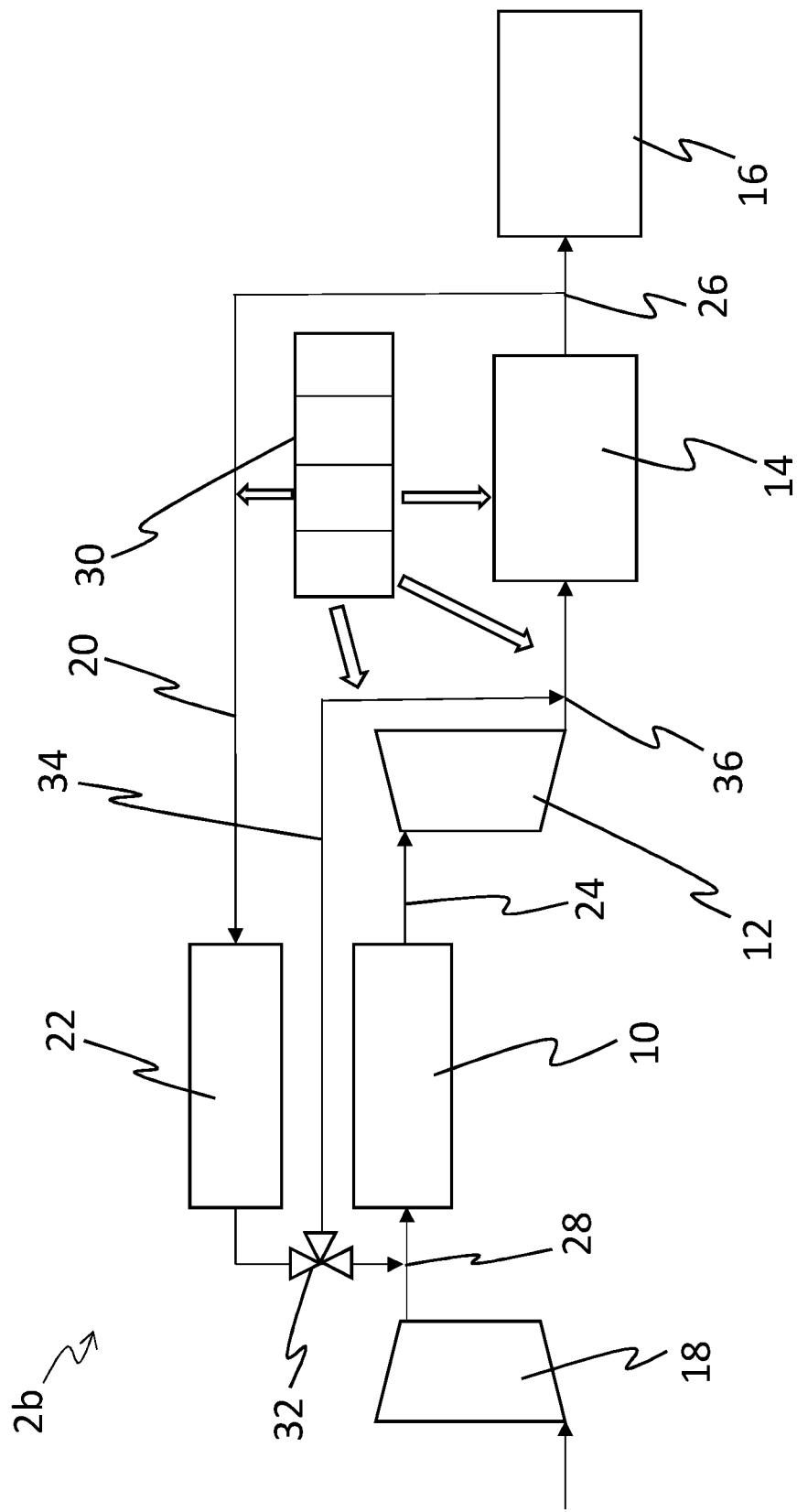
FIG. 4 illustrates schematically an internal combustion engine system, in accordance with at least a second exemplary embodiment of the present invention.

FIG. 4 illustrates schematically an internal combustion engine system 2b, in accordance with at least a second exemplary embodiment of the present invention. In this example, said first point 26, i.e. the point from which the exhaust gas is recirculated via the EGR duct 20, is located downstream of the EATS 14. In the normal operation mode, the EGR pump 22 will transport at least a portion of the exhaust gas from the first point 26 to a second point 28 located upstream of the ICE 10. The second point 28 is here illustrated as being downstream of the compressor 18. A conceivable alternative would be to have the second point 28 upstream of the compressor 18. A regulating valve (not shown) may be used to regulate how much of the exhaust gas is to be recirculated and how much is to be lead to the tail pipe 16.

In the illustrated exemplary embodiment, the EGR pump 22 is configured to transport fluid in only one direction, i.e. in this exemplary embodiment, the pumping direction is not intended to be reversed in the pre-heat operation mode. On the downstream side of the EGR pump 22, there is provided a three-way valve 32. In the normal operation mode the three-way valve 32 is controlled to direct the recirculated exhaust gas to the second point 28, upstream of the ICE 10. In the pre-heat operation mode, however, the three-way valve 32 is controlled to direct the recirculated exhaust gas via a diverter duct 34 to a recombination point 36 located at the exhaust gas duct 24, downstream of the ICE 10. In the illustrated example, the recombination point 36 is also downstream of the turbine 12 but upstream of the EATS 14. Other locations of the recombination point 36 are, however, conceivable, such as upstream of the turbine 12 or between exhaust aftertreatment devices of the EATS 14.

The heating device 30 is suitably located downstream of the recombination point 36, but upstream of the EATS 14 (or the exhaust aftertreatment device(s) of the EATS 14 to be pre-heated), however, as illustrated by the white arrows, other locations are also conceivable. Thus, the heating device may, for instance, be located at the diverter duct 34, or downstream of the recombination point 36 but upstream of the EATS 14, or at the EATS 14, or at the EGR duct 20. In the pre-heat operation mode, the EGR pump 22 transports fluid through the internal combustion engine system 2b. If the ICE 10 is turned off, the fluid may be air drawn through the compressor 18 and the ICE 10. If the ICE 10 is turned on, the fluid may be exhaust gas (and possibly mixed with air). Since the pre-heat operation mode may basically function as a closed loop system, the heating device 30 could be placed anywhere along that loop to heat the fluid which in turn will provide thermal energy to the EATS 14.

Figure 5:
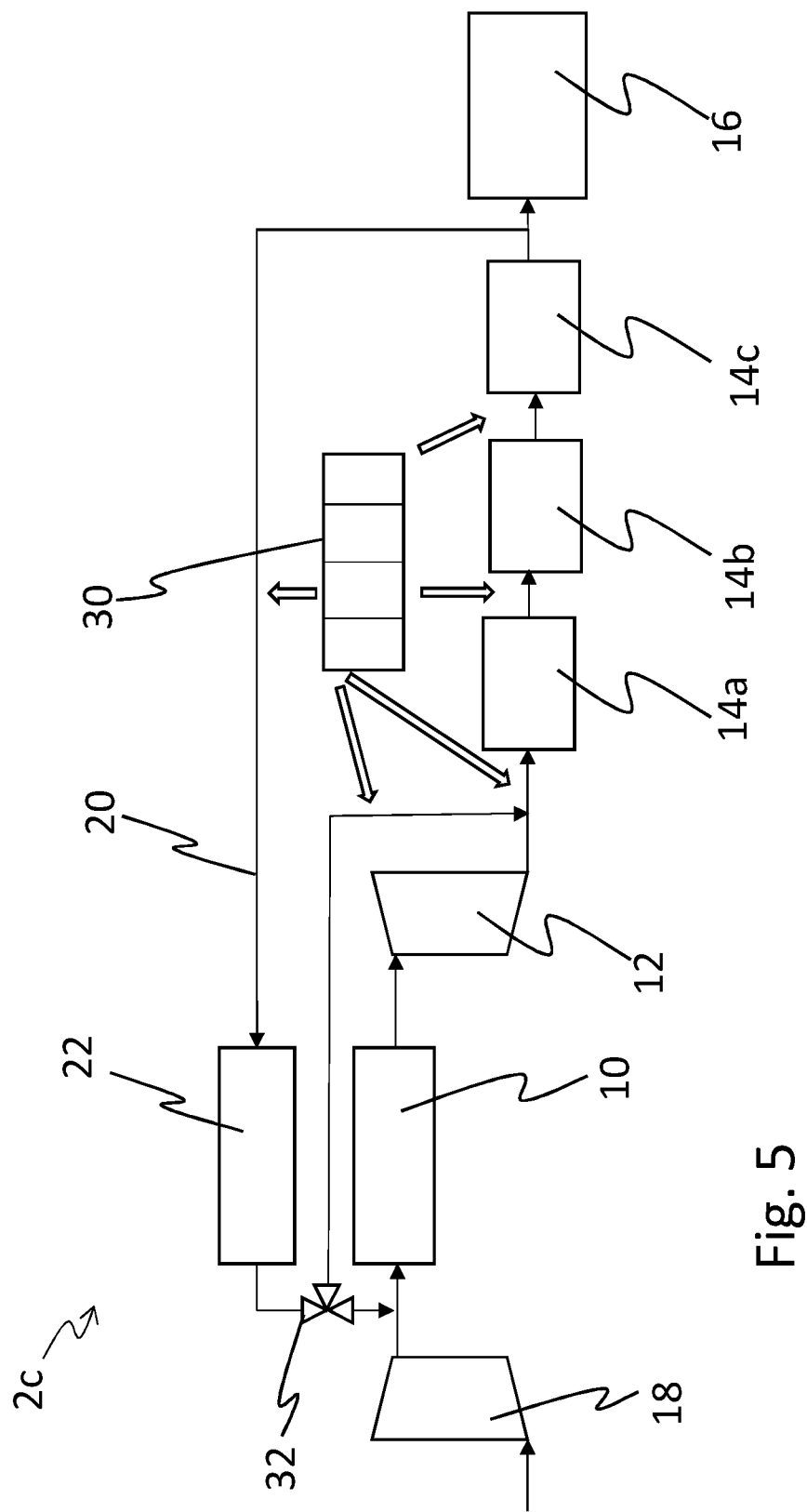
FIG. 5 illustrates schematically an internal combustion engine system, in accordance with at least a third exemplary embodiment of the present invention.

FIG. 5 illustrates schematically an internal combustion engine system 2c, in accordance with at least a third exemplary embodiment of the present invention. The difference between FIG. 5 and FIG. 4 is that exhaust aftertreatment devices of the EATS are explicitly indicated in FIG. 5. Thus, FIG. 5 illustrates that in this exemplary embodiment, the EATS comprises a DOC 14a, a DPF 14b and an SCR 14c. As indicated by the white arrows, the heating device may be located upstream of either one of these exhaust aftertreatment devices 14, 14b, 14c, or at the EGR duct 20.

Figure 6:
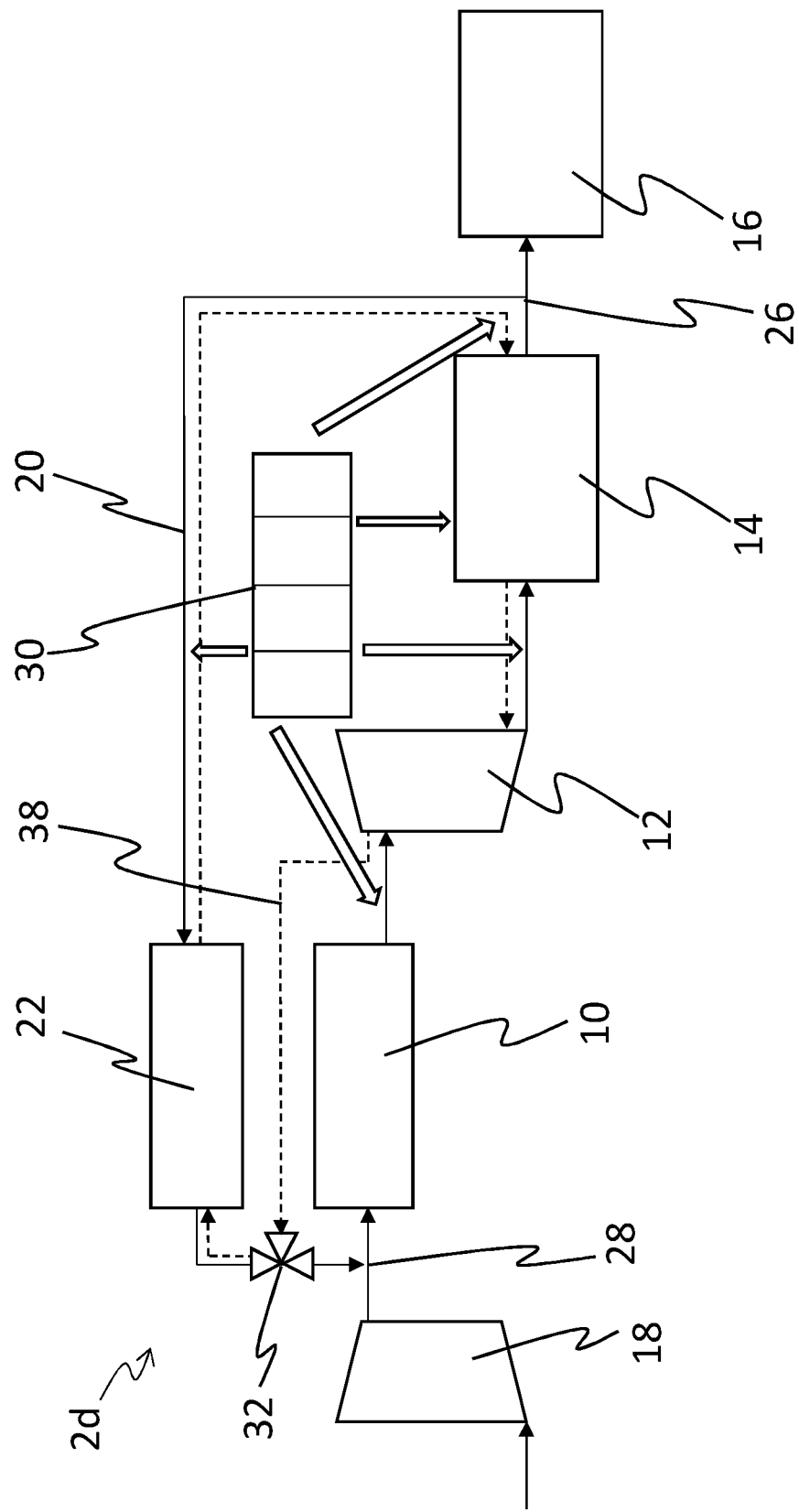
FIG. 6 illustrates schematically an internal combustion engine system, in accordance with at least a fourth exemplary embodiment of the present invention.

FIG. 6 illustrates schematically an internal combustion engine system 2d, in accordance with at least a fourth exemplary embodiment of the present invention. In the normal operation mode the flow of exhaust gas is recirculated from a first point 26 downstream of the EATS 14, via the EGR duct 20, to a second point 28 upstream of the ICE 10, in the corresponding manner as already discussed in connection with FIG. 4. Thus, the three-way valve 32 is controlled to direct the exhaust gas leaving the EGR pump 22 to the second point 28 upstream of the ICE 10. In the pre-heat operation mode, however, the three-way valve 32 is controlled to close the path to the second point 28 upstream of the ICE 10 and instead open a path 38 from the turbine 12 (or from a point between the ICE 10 and the turbine 12). Also, in the example of FIG. 6, in the pre-heat operation mode the EGR pump 22 is controlled to transport the fluid in the reverse direction. This is illustrated by the dashed arrows. The heating device 30 may suitably be located between the EATS 14 and the tail pipe 16, or anywhere downstream of the EGR pump 22 but upstream of the EATS 14 (downstream and upstream being understood in this case as being defined with respect to the flow is in said reverse direction, dashed arrows). However, other locations of the heating device 30 may also be conceivable, in particular if the fluid is transported in a closed loop during the pre-heat operation mode. For, instance, as illustrated by the white arrows, the heating device 30 may be located at the EGR duct 20, or upstream of the ICE 10 but downstream of the turbine 12, or between the turbine 12 and the EATS 14, or at the EATS 14.

Figure 7:
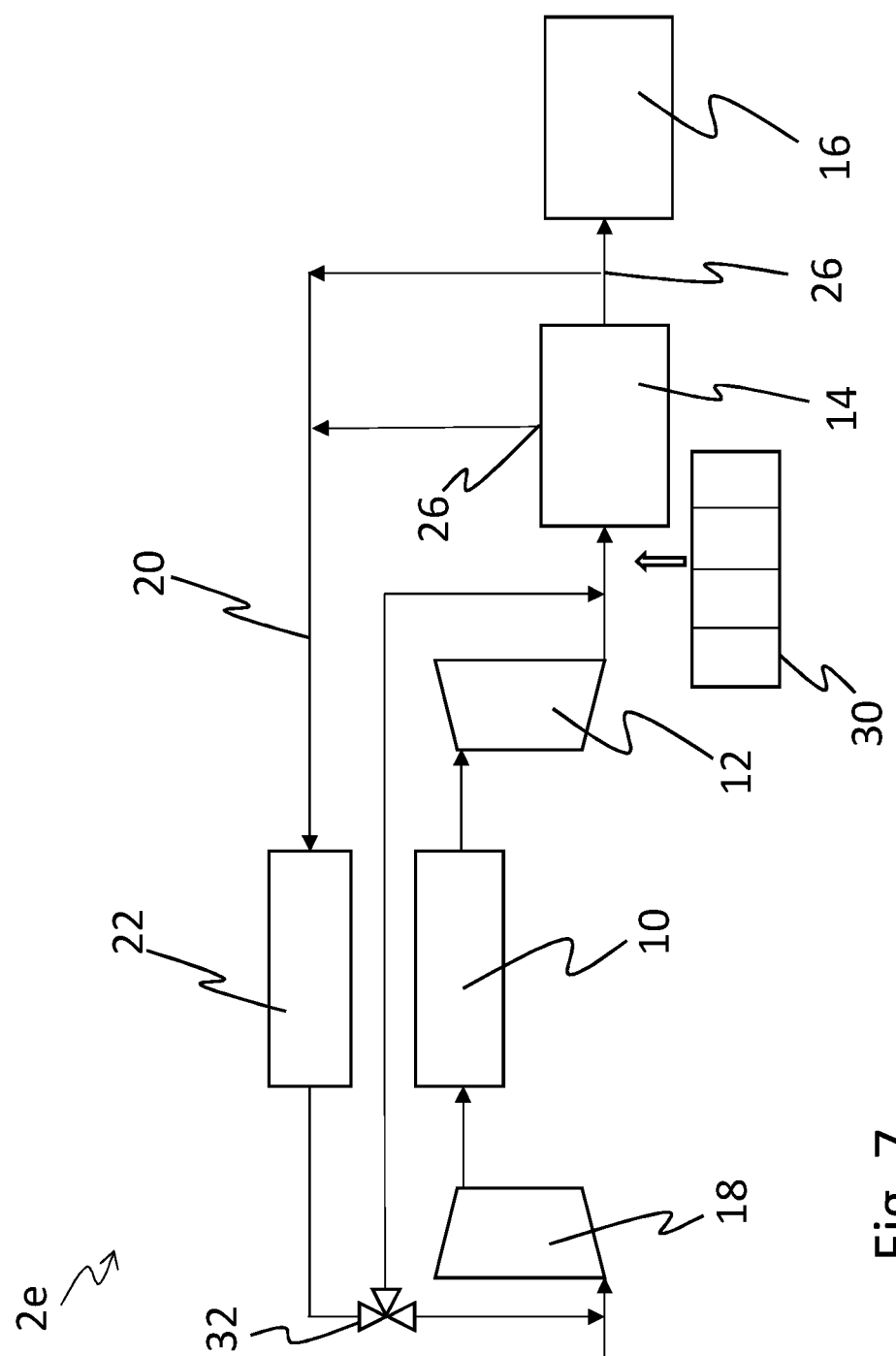
FIG. 7 illustrates schematically an internal combustion engine system, in accordance with at least a fifth exemplary embodiment of the present invention.

FIG. 7 illustrates schematically an internal combustion engine system 2e, in accordance with at least a fifth exemplary embodiment of the present invention. In the illustrated example, two different first points 26 for recirculating exhaust gas are illustrated as being conceivable alternatives. One of the alternatives is to recirculate the exhaust gas from a location between the EATS 14 and the tail pipe 16, similar to the examples of FIGS. 4-6. Another alternative that is illustrated in FIG. 7, is to recirculate the exhaust gas from a point 26 within the EATS 14, such as between two exhaust aftertreatment devices of the EATS 14. The heating device 30 is suitably provided downstream of the turbine 12 but upstream of the EATS 14. Although only one white arrow is (to keep the illustration clear), it should be understood that, similarly to the other figures, the heating device 30 in this exemplary embodiment may be located at any one of the previously discussed locations.

Figure 8:
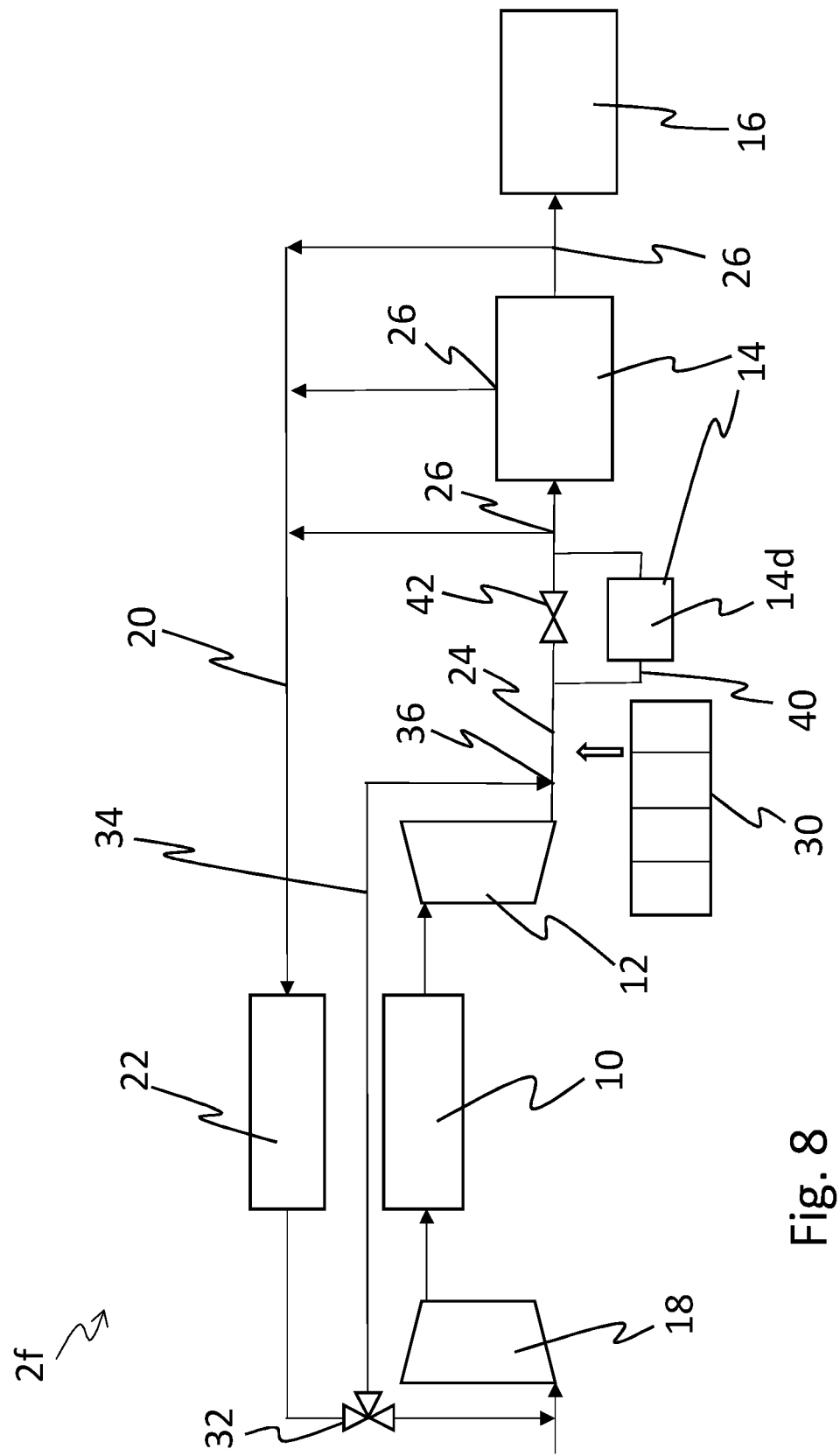
FIG. 8 illustrates schematically an internal combustion engine system, in accordance with at least a sixth exemplary embodiment of the present invention.

FIG. 8 illustrates schematically an internal combustion engine system 2f, in accordance with at least a sixth exemplary embodiment of the present invention. In addition to the options illustrated in FIG. 7, another optional location for placing the first point 26 for recirculating fluid is presented in FIG. 8, namely directly upstream of the exhaust aftertreatment device(s) of the EATS 14 discussed in FIG. 7. In the exemplary embodiment of FIG. 8, the EATS 14 comprises an additional exhaust aftertreatment device, namely a purification device 14*d* in a separate purification duct 40. Thus, as shown in FIG. 8, the internal combustion engine system 2*f* comprises a purification duct 40, being in fluid communication with said exhaust gas duct 24 and comprising a purification device 14*d*. The purification duct 40 may provide an alternative route from the turbine 12 to the EATS 14 (or from the recombination point 36 to the EATS 14). A valve 42 in the exhaust gas duct 24 may be provided for switching between a first state in which at least some of the fluid is allowed to by-pass the purification device 14*d*, and a second state in which all the fluid flows through the purification duct 40 and its purification device 14*d*. The purification device 14*d* may suitably be a small-sized SCR, i.e. smaller than any SCR in the part of EATS 14 downstream of the purification duct 40. A small-sized purification device 14*d* may reach its desired operating temperature faster than a larger device. It may therefore be advantageous to recirculate the fluid downstream of the purification duct 40 but upstream of the rest of the EATS 14, i.e. said first point 26 may be located directly upstream of the rest of the EATS 14 devices. This provides for a short loop in the pre-heat operation mode in which the EGR pump 22 transports the fluid from said first point 26, via the EGR duct 20, the three-way valve 32 and the diverter duct 34, to the recombination point 36 downstream of the turbine 12 but upstream of the purification duct 40. The heating device 30 is suitably located downstream of the recombination point 36 but upstream of the purification duct 40. The recirculated fluid will be quickly heated and the purification device 14*a* will quickly reach its desired operating temperature.

It should be understood that the various components illustrated in the different exemplary embodiments may be implemented in other embodiments as well. For instance, the purification duct 40 and its purification device 14*d* of FIG. 8 may be implemented in the exemplary embodiments shown in FIGS. 3-7.

Figure 9:
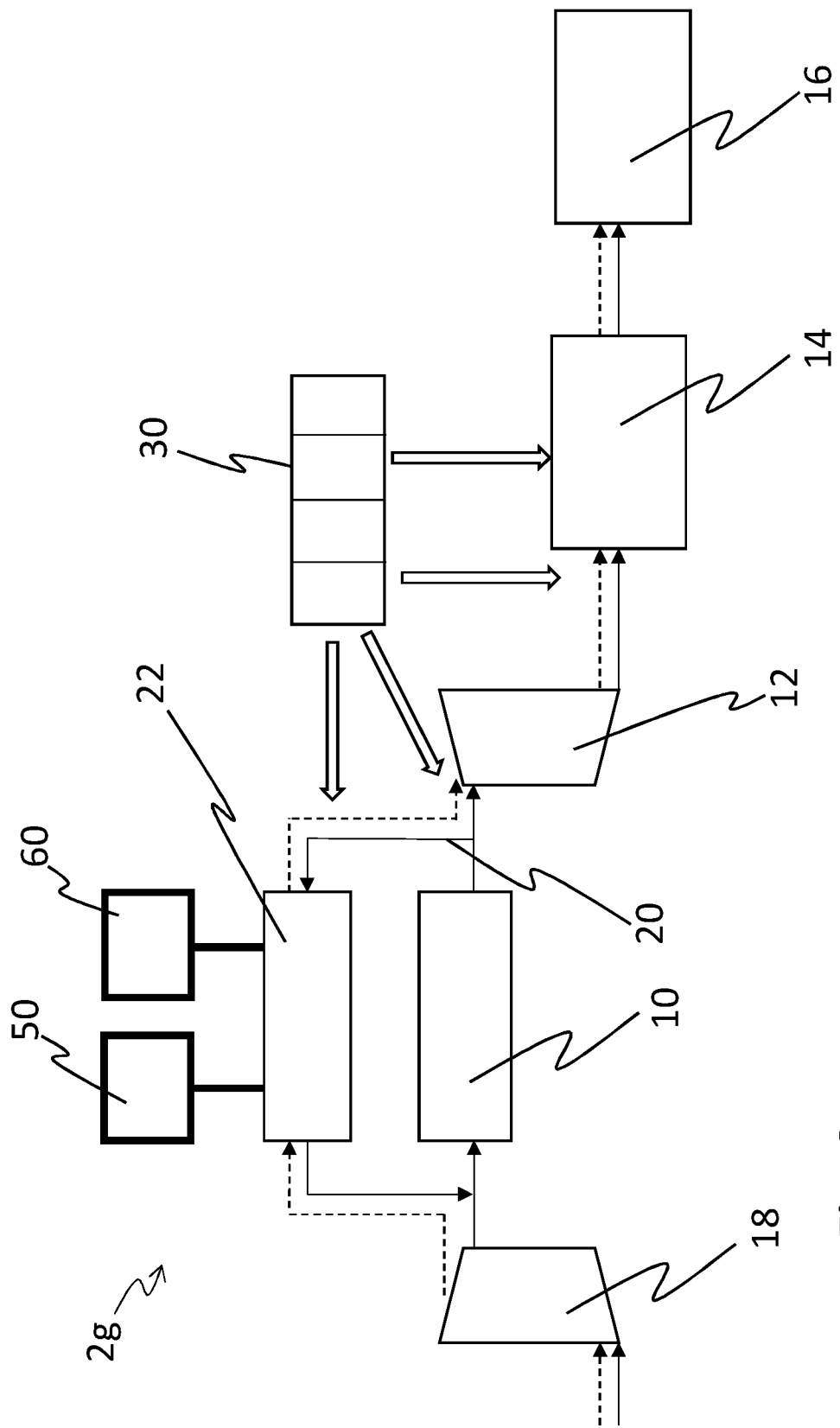
FIG. 9 illustrates schematically an internal combustion engine system, in accordance with at least a seventh exemplary embodiment of the present invention.

FIG. 9 illustrates schematically an internal combustion engine system 2*g*, in accordance with at least a seventh exemplary embodiment of the present invention. For simplicity, the illustration in FIG. 9 is based on the exemplary embodiment of FIG. 3, however, as will be explained the additional components could be implemented in any one of the exemplary embodiments. In addition to the components illustrated in FIG. 3, the illustration in FIG. 9 also includes an electrical energy source 50 for providing energy to the EGR pump 22. The electrical energy source 50 may provide energy to the EGR pump 22 when the ICE 10 is off, and/or when the ICE 10 is turned on. It should be understood that such an electrical energy source 50 may be used for providing energy to the EGR pump 22 in any one of the above discussed exemplary embodiments, and is thus not limited to the embodiment of FIG. 9.

FIG. 9 also illustrates a control unit 60 which may control the pumping direction of the EGR pump 22, i.e. the control unit 60 may be used for controlling the switching between the pre-heat operation mode and the normal operation mode. It should be understood that the control unit 60 may be used in the previously discussed embodiments as well, and should therefore not be limited to the embodiment of FIG. 9. In particular, it should be understood that such a control unit 60 may be used for opening and closing the various valves shown in some embodiments of the other drawing figures. The control unit 60 may suitably be used for carrying out the steps of the method in FIG. 10 and/or the exemplary embodiment of the method in FIG. 11, both of which will be discussed further below.

Thus, in general, it should be understood that the vehicle 1 of FIG. 1 may be provided with a control unit 60. The control unit 60 may comprise or may be comprised in a processing circuitry. The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with the control unit.

FIG. 10 illustrates schematically a method 100 according to at least one exemplary embodiment of the present invention. Thus, there is provided a method 100 for exhaust gas aftertreatment for an internal combustion engine system, the internal combustion engine system comprising an internal combustion engine (ICE), an exhaust aftertreatment system (EATS) located downstream of said ICE and comprising one or more exhaust aftertreatment devices, an exhaust gas duct fluidly connecting said ICE and said EATS, an exhaust gas recirculation duct being in fluid communication with said exhaust gas duct and fluidly connecting a first point downstream of said ICE and a second point upstream thereof, and an exhaust gas recirculation (EGR) pump arranged in said exhaust gas recirculation duct, the internal combustion engine system having a normal operation mode for transporting, by means of the EGR pump, at least a portion of said exhaust gas from said first point to said second point. The method 100 comprises the steps of:

in a first step S1, determining a temperature of one or more exhaust aftertreatment devices of said EATS, in a second step S2, comparing said determined temperature with a predetermined threshold value; and in a third step S3, if said determined temperature is below said predetermined threshold value, running said internal combustion engine system in a pre-heat operation mode such that exhaust gas and/or air passes, by means of the EGR pump, through a heating device arranged upstream of at least one of said exhaust aftertreatment devices of said EATS and then to said at least one of said exhaust aftertreatment devices.

Suitably the method 100 may be performed when the ICE is off.

FIG. 11 illustrates schematically a method 200 according to at least another exemplary embodiment of the present invention. It comprises the same steps S1-S3 as the method 100 of FIG. 10, but it also comprises the following additional step:

in a step S4, running said EGR pump in a reverse direction in the pre-heat operation mode of the internal combustion engine system, in comparison with the direction in the normal operation mode.

Thus, this exemplary embodiment may suitably be implemented in relation to an internal combustion engine system such as the ones illustrated, by way of example, in FIGS. 3, 6 and 9.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine system, comprising:
an internal combustion engine (ICE),
an exhaust aftertreatment system (EATS) located downstream of said ICE and comprising one or more exhaust aftertreatment devices,
an exhaust gas duct fluidly connecting said ICE and said EATS,
an exhaust gas recirculation duct being in fluid communication with said exhaust gas duct and fluidly connecting a first point downstream of said ICE and a second point upstream thereof,
an exhaust gas recirculation (EGR) pump arranged in said exhaust gas recirculation duct, wherein the internal combustion engine system has a normal operation mode for transporting, by means of the EGR pump, at least a portion of said exhaust gas from said first point to said second point,
a heating device arranged upstream of at least one of said exhaust aftertreatment devices of said EATS and in that the internal combustion engine system has a pre-heat operation mode for transporting, by means of the EGR pump, exhaust gas and/or air through said heating device and then to said at least one of said exhaust aftertreatment devices, and
a valve arranged downstream of said EGR pump, said valve comprising:
a first outlet fluidly connecting said EGR pump and said ICE, and
a second outlet fluidly connecting said EGR pump and a diverter duct, said diverter duct fluidly connecting said EGR pump and a recombination point at said exhaust gas duct upstream of said heating device.

2. The internal combustion engine system according to claim 1, wherein said first point downstream of said ICE is arranged adjacent to or within said EATS.

3. The internal combustion engine system according to claim 1, wherein said valve is operable between a first open position and a second closed position.

4. The internal combustion engine system according to claim 1, wherein said first point downstream of said ICE is arranged immediately downstream of said ICE.

5. The internal combustion engine system according to claim 1, comprising a purification duct, being in fluid communication with said exhaust gas duct and comprising a purification device.

6. The internal combustion engine system according to claim 1, wherein said one or more exhaust aftertreatment devices of said EATS comprise at least one of a diesel oxidation catalyst, a diesel particulate filter and a selective catalytic reduction device.

7. The internal combustion engine system according to claim 1, comprising an electrical energy source, wherein said electrical energy source provides energy to said EGR pump when said ICE is off.

8. The internal combustion engine system according to claim 1, wherein said internal combustion engine system is configured to be operable in said pre-heat operation mode when said ICE is off.

9. The internal combustion engine system according to claim 1, wherein said EGR pump is configured to be operable in a reverse direction when said ICE is off.

10. A vehicle comprising an internal combustion engine system according to claim 1.

* * * * *